US012689650B2

(12) United States Patent
Jain et al.

(10) Patent No.: US 12,689,650 B2
(45) Date of Patent: Jul. 21, 2026

(54) SYSTEM AND METHOD FOR CYBERSECURITY RISK MANAGEMENT

(71) Applicant: INDIAN INSTITUTE OF TECHNOLOGY KANPUR, Kanpur (IN)

(72) Inventors: Rishik Jain, Kanpur (IN); Rohit Negi, Kanpur (IN); Sandeep Kumar Shukla, Kanpur (IN)

(73) Assignee: INDIAN INSTITUTE OF TECHNOLOGY KANPUR, Kanpur (IN)

( * ) Notice: Subject to any disclaimer, the term of this patent is extended or adjusted under 35 U.S.C. 154(b) by 30 days.

(21) Appl. No.: 18/798,689

(22) Filed: Aug. 8, 2024

(65) Prior Publication Data

US 2025/0343815 A1    Nov. 6, 2025

(30) Foreign Application Priority Data

May 3, 2024   (IN) .............................. 202411035326

(51) Int. Cl.
H04L 9/40          (2022.01)
(52) U.S. Cl.
CPC ...... H04L 63/1433 (2013.01); H04L 63/1416 (2013.01)
(58) Field of Classification Search
CPC ........................ H04L 63/1433; H04L 63/1416
See application file for complete search history.

(56) References Cited

U.S. PATENT DOCUMENTS

| | | | | |
|---|---|---|---|---|
| 9,712,554 | B2 * | 7/2017 | Hassanzadeh | ...... H04L 63/0227 |
| 12,223,056 | B1 * | 2/2025 | Zhang | .................... G06N 3/042 |
| 2013/0104236 | A1 * | 4/2013 | Ray | ......................... H04L 63/20 |
| | | | | 726/25 |
| 2020/0177616 | A1 * | 6/2020 | Hadar | ................. H04L 63/1433 |
| 2020/0177619 | A1 * | 6/2020 | Hadar | ................... H04L 43/026 |
| 2020/0351295 | A1 | 11/2020 | Nhlabatsi et al. | |
| 2022/0131894 | A1 * | 4/2022 | Hassanzadeh | ...... H04L 63/1433 |
| 2023/0275909 | A1 * | 8/2023 | Shivamoggi | ........ H04L 63/1441 |
| | | | | 726/23 |
| 2024/0265113 | A1 * | 8/2024 | Napper | ................. G06F 21/552 |
| 2024/0388598 | A1 * | 11/2024 | Cartan | ................ H04L 63/1425 |

OTHER PUBLICATIONS

Masoud Khosravi-Farmad et al., "Considering Temporal and Environmental Characteristics of Vulnerabilities in Network Security Risk Assessment", 2014 11th International ISC Conference on Information Security and Cryptology, pp. 186-191, Sep. 3-4, 2014, Tehran, Iran, Total pp. 06.

* cited by examiner

*Primary Examiner* — Theodore C Parsons
*Assistant Examiner* — Alan L Kong
(74) *Attorney, Agent, or Firm* — Bochner PLLC; Andrew D. Bochner

(57)          ABSTRACT
The present disclosure provides a system and methods for cyber risk management. The system determines risk values for a network environment having one or more assets based on asset weights of the assets and impact vectors of one or more vulnerabilities associated with the assets. The system iteratively generates one or more attack paths using the vulnerabilities, and applies one or more security controls to mitigate the vulnerabilities to prevent attackers from attacking the network environment using any of the attack paths.

12 Claims, 7 Drawing Sheets

100

200

SYSTEM
110

| PROCESSOR 202 | MEMORY 204 | I/O INTERFACE 206 |

PROCESSING ENGINE(S)
208

ASSET WEIGHT DETERMINATION ENGINE
212

ATTACK PATH GENERATION ENGINE
214

CYBER RISK DETERMINATION ENGINE
216

TREATMENT ENGINE
218

OTHER ENGINE(S)
220

DATABASE
210

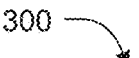

300

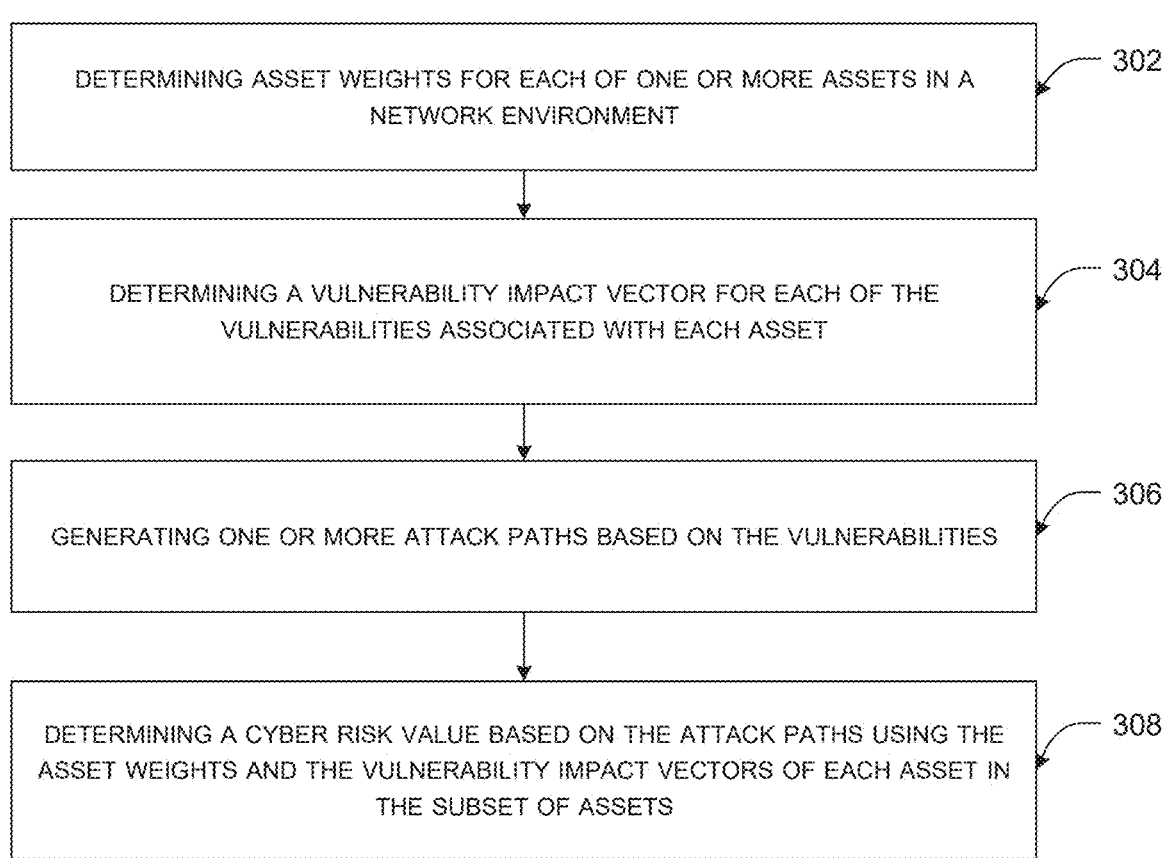

DETERMINING ASSET WEIGHTS FOR EACH OF ONE OR MORE ASSETS IN A NETWORK ENVIRONMENT ⟍ 302

DETERMINING A VULNERABILITY IMPACT VECTOR FOR EACH OF THE VULNERABILITIES ASSOCIATED WITH EACH ASSET ⟍ 304

GENERATING ONE OR MORE ATTACK PATHS BASED ON THE VULNERABILITIES ⟍ 306

DETERMINING A CYBER RISK VALUE BASED ON THE ATTACK PATHS USING THE ASSET WEIGHTS AND THE VULNERABILITY IMPACT VECTORS OF EACH ASSET IN THE SUBSET OF ASSETS ⟍ 308

FIG. 3A

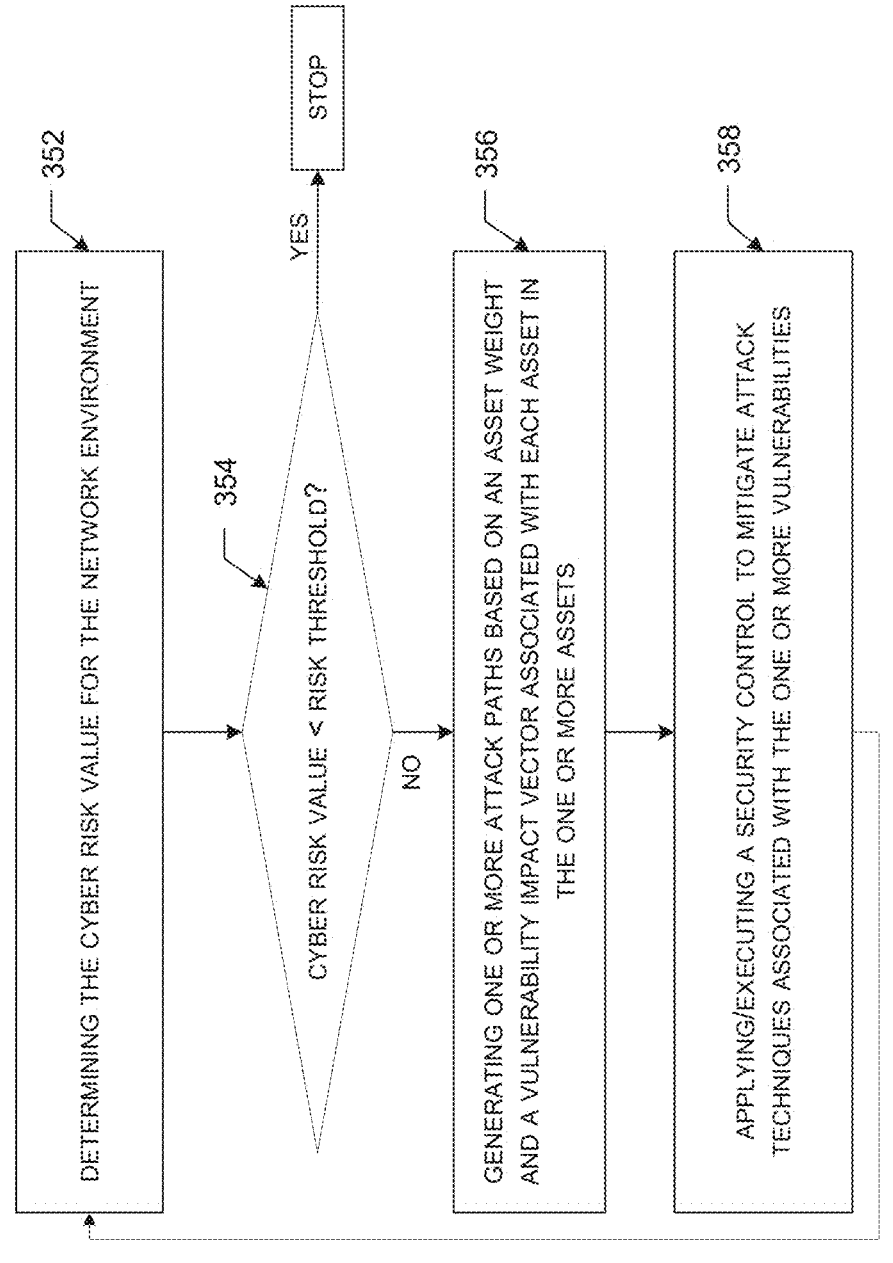

DETERMINING THE CYBER RISK VALUE FOR THE NETWORK ENVIRONMENT — 352

354 — CYBER RISK VALUE < RISK THRESHOLD?

YES → STOP

NO

GENERATING ONE OR MORE ATTACK PATHS BASED ON AN ASSET WEIGHT AND A VULNERABILITY IMPACT VECTOR ASSOCIATED WITH EACH ASSET IN THE ONE OR MORE ASSETS — 356

APPLYING/EXECUTING A SECURITY CONTROL TO MITIGATE ATTACK TECHNIQUES ASSOCIATED WITH THE ONE OR MORE VULNERABILITIES — 358

SYSTEM AND METHOD FOR CYBERSECURITY RISK MANAGEMENT

TECHNICAL FIELD

The present disclosure relates to the field of cyber security risk management. In particular, the present disclosure provides a system and a method for cybersecurity risk management.

BACKGROUND

Cyber risk management, also called cybersecurity risk management, is the process of identifying, prioritizing, managing and monitoring risks to information systems. Effective cyber risk management is critical for organizations to ensure the continuity of their operations and protect their assets, reputation, and stakeholders. Existing cyber risk management solutions use many automated systems to protect computing devices interconnected to form a networked environment.

Existing solutions in the domain of cyber risk management focus on laying down theoretical foundations and establishing standards and frameworks. However, there is a dearth of practical implementations therefor. The methodologies adopted by existing solutions often analyze for vulnerabilities in an isolated manner, i.e. they identify vulnerabilities within one computing device and do not consider the architecture/network as a whole. Such solutions focus primarily on technical vulnerabilities and fail to consider vulnerabilities in the broader context of an organization's operations, business processes, third-party relationships, regulatory compliance, etc.

Furthermore, existing cyber risk assessment tools are standardized, and are not necessarily adapted or adaptable to specific needs and requirements of each organization. This may lead to situations where something that is a bug for a first entity but is a feature for a second entity is not flagged by the standardized solution, thereby increasing cyber risk of the organization. Additionally, standardization may also make it difficult to assess/quantify the level of risk/security in a network and determine efficacy of security control measures in the specific contexts in which the organization operates.

Existing solutions are also static, and cannot be easily adapted to dynamic and adversarial nature of cyber security risks. For example, since attackers continually look for vulnerabilities in the network, it is desirable to have cyber security solutions that dynamically resolve newly found vulnerabilities as quickly as possible. Further, the network architecture/environment of the organization may also not always be static (such as when new services and features are introduced), and hence it is desirable to have cyber risk management solutions that recognize changes in the organization and learn to accurately assess cyber risks in the new environment.

Therefore, there is a need for a system and a method for dynamically determining cyber security risk scores and recommending security control measures for any organizational context.

SUMMARY

The present disclosure relates to the field of cyber security risk management. In particular, the present disclosure provides a system and a method for cybersecurity risk management.

An aspect of the present disclosure pertains to a method for cyber risk assessment. The method includes determining, by a processor, asset weights for each of one or more assets in a network environment, and determining a vulnerability impact vector for each of one or more vulnerabilities associated with each asset in the one or more assets. The method further includes generating one or more attack paths based on the one or more vulnerabilities, where each of the one or more attack paths indicate paths for lateral movement between a subset of assets from the one or more assets. The method includes determining a cyber risk value based on the one or more attack paths using the asset weights and the vulnerability impact vectors of each asset in the subset of assets. A system may include a memory having the method for cyber risk assessment stored as processor-executable instructions, and a processor that executes the processor-executable instructions in the memory.

In some embodiments, each of the one or more assets may be associated with one or more functions. Further, the asset weights for each asset in the one or more assets may be determined as a weighted average of a function impact vector of the one or more functions using a corresponding business impact value and a corresponding relative asset value of the asset within the function.

In some embodiments, for determining the cyber risk value, the method may include determining an impact value for each attack path in the one or more attack paths, and selecting a highest impact value from the impact values associated with the one or more attack paths as the cyber risk value.

In some embodiments, for determining the impact value, the method may include determining a dot product of the asset weight and the corresponding impact vector for each asset in the subset of assets associated with each attack path, and aggregating the dot products for each of the assets in the subset of assets to obtain the impact value for each attack path.

In some embodiments, for selecting the attack path having the highest impact value, the method may include initializing a partial impact value for each of the one or more assets to a predetermined value, identifying, by the processor, one or more entry point assets from the one or more assets. The method may further include until one or more target assets are reached, iteratively identifying one or more next/subsequent assets reachable from a prior asset, and traversing to each of the one or more next assets and incrementing the partial impact values associated with each of the next assets by a sum of a dot product of the corresponding asset weights and the corresponding vulnerability impact vector, and the partial impact value of the prior asset.

In another aspect, the present disclosure pertains to a method for cyber risk treatment. The method includes, until a cyber risk value of a network environment having one or more assets falls below a predetermined threshold, iteratively generating, by a processor, one or more attack paths based on an asset weight and a vulnerability impact vector associated with each asset in the one or more assets, and applying/executing, by the processor, a security control to mitigate attack techniques associated with the one or more vulnerabilities. A system may include a memory having the method for cyber risk treatment stored as processor-executable instructions, and a processor that executes the processor-executable instructions in the memory.

In some embodiments, the security control may be applied in a simulated environment. The method may include providing the security control applied in each iteration as a recommendation to operators of the network environment.

In some embodiments, the one or more attack paths may be generated by tracing the lateral movement taken by an attacker.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 3A illustrates a flowchart of an example method for cyber risk assessment, according to embodiments of the present disclosure.

FIG. 3B illustrates a flowchart of an example method for cyber risk treatment, according to embodiments of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the scope of the present disclosures as defined by the appended claims.

Embodiments explained herein relate to the field of cyber security risk management. In particular, the present disclosure provides a system and a method for cybersecurity risk management. Various embodiments of the present disclosure will be explained in detail with reference to FIGS. 1-5.

Figure 1:
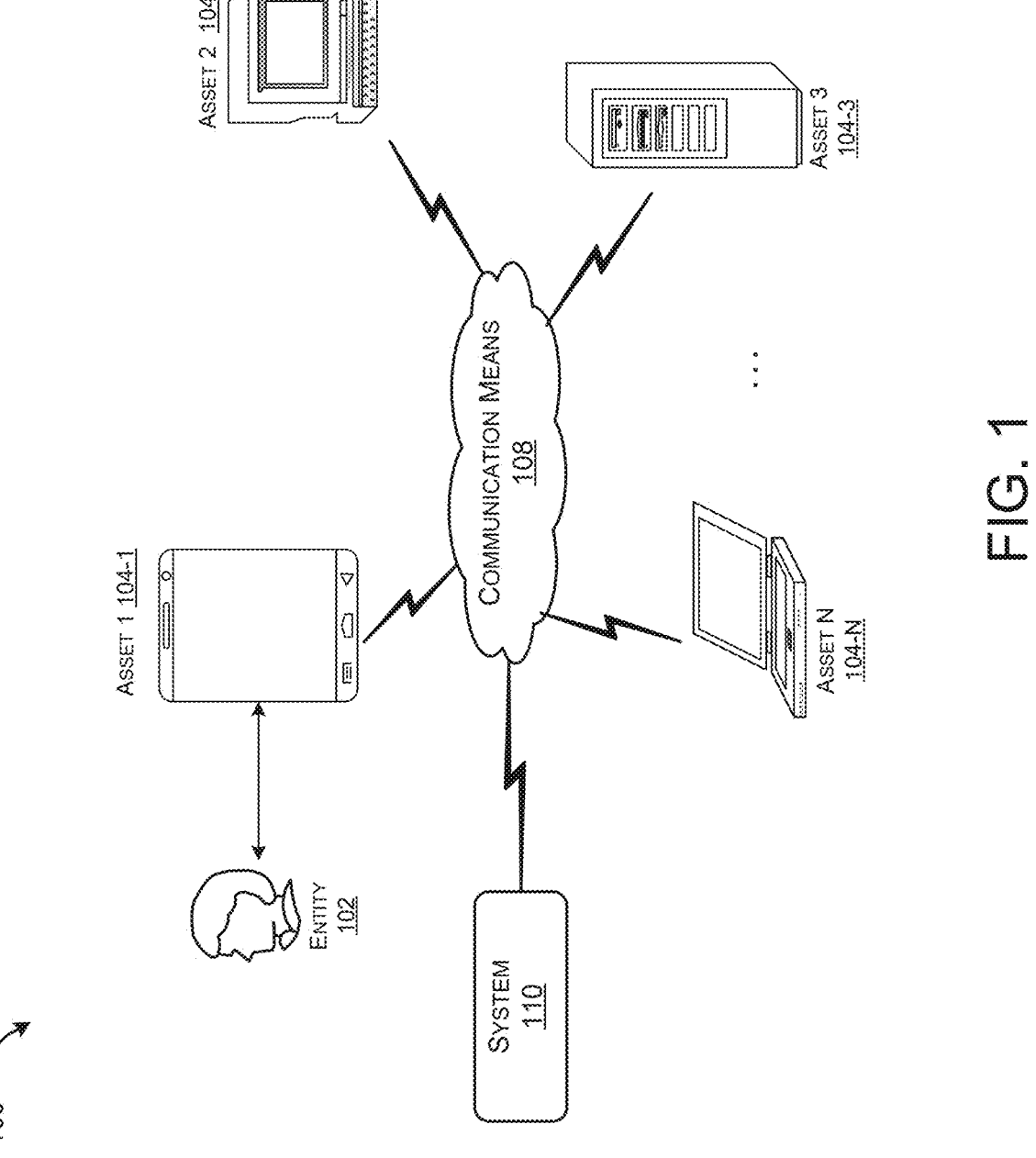
FIG. 1 illustrates an example representation of a network environment implementing a system for cyber security risk management, according to embodiments of the present disclosure.
Figure 2:
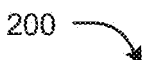
FIG. 2 illustrates an example block diagram of the system, according to embodiments of the present disclosure.

FIG. 1 illustrates an example network environment/architecture 100. The network environment 100 includes one or more assets, such as assets 104-1 to 104-N (hereinafter collectively referred to as assets 104). The assets 104 may be interact with each other using the communication means 108. At least one of the assets 104 may be operated by an entity 102. The network environment 100 may also include or be associated with a system 110 configured to manage cybersecurity of the network environment 100. The network environment 100 may be operated and managed by an organization/a set of operators. While FIG. 1 shows few components of the network environment 100, it may be appreciated by those skilled in the art that the network environment 100 may be suitably adapted to include other components or elements not explicitly shown in FIG. 1.

The assets 104 may correspond to computing devices or humans participating in the network environment 100. A subset of the assets 104 may be at least one of an electrical, an electronic, an electromechanical, and a computing device. The assets 104 may be implemented in any one of, without limitation, a mobile device, a smart-phone, a Personal Digital Assistant (PDA), a tablet computer, a phablet computer, a wearable computing device, a laptop, a desktop, a server, a database, internet of things (IoT), industrial equipment (such as operated by Supervisory Control and Data Acquisition systems (SCADA)), and the like. In some embodiments, each of the assets 104 may include a processor configured to execute one or more processor-executable instructions stored in a corresponding memory (not shown).

The assets 104 may communicate with each other using the communication means 108. The communication means 108 may be indicative of wired or wireless communication means. Examples of wired communication means may include, but not be limited to, electrical wires/cables, optical fibre cables, and the like. Examples of wireless communication means may include any wireless communication network capable of transferring data using means including, but not limited to, radio communication, satellite communication, a Bluetooth, a Zigbee, a Near Field Communication (NFC), a Wireless-Fidelity (Wi-Fi) network, a Light Fidelity (Li-Fi) network, a carrier network including a circuit-switched network, a packet switched network, a Public Switched Telephone Network (PSTN), a Content Delivery Network (CDN) network, an Internet, intranets, Local Area Networks (LANs), Wide Area Networks (WANs), mobile communication networks including a Second Generation (2G), a Third Generation (3G), a Fourth Generation (4G), a Fifth Generation (5G), a Sixth Generation (6G), a Long-Term Evolution (LTE) network, a New Radio (NR), a Narrow-Band (NB), an Internet of Things (IoT) network, a Global System for Mobile Communications (GSM) network and a Universal Mobile Telecommunications System (UMTS) network, combinations thereof, and the like.

The assets 104 may also include human assets. Human assets may also be factored/used for determining and managing cyber security risk due to their roles in the organization. For example, human assets that handle highly confidential data may also be a vulnerability to an organization as significant amount of trust is placed on such human assets. Hence, measures may be required to ensure confidential data is not abused if the individual/human asset turns hostile or negligently exposes their credentials to third party attackers.

Both the human and computer assets 104 may be represented using an appropriate data structure. The data structure may include one or more attributes associated with the assets 104. Some attributes may be different based on the type of assets 104, while other attributes may be common to both types of assets 104. For example, all assets 104 may have an asset weight associated therewith, which may be represented using a vector. Each value in the vector may correspond to at least one of a confidentiality value, an integrity value, or an availability value (collectively referred to as CIA values/vector), but not limited thereto. The asset weights may be determined by the system 110, as described subsequently in reference to FIGS. 2, 3A and 3B.

The assets 104 may be operated by corresponding entities. In some embodiments, the entity 102 may be a human entity. The human entity may operate at least one of the assets 104 (such as asset 104-1) to interact with the network environment 100, to either perform a function or receive a service, but not limited thereto. In other embodiments, the entity 102 may be an automated entity (such as another asset) that sends signals to the corresponding asset 104 to execute one or more processor-executable instructions. For example, an asset indicative of a database may be operated by a corresponding server for retrieving data.

The assets 104 of the network environment 100 may be configured to perform one or more functions/function definitions. The assets 104 and the function definitions may have a many-to-many relation, i.e. performing each function may require multiple assets 104, and each asset 104 may be involved in multiple functions. In some embodiments, each asset 104 may execute a set of processor-executable instructions to perform the assigned function definitions. Examples of functions may include network management, research and development, sales, data management, provision of services, and the like, but be not limited thereto.

Each of the function definitions may be represented using a data structure. The data structure may include a plurality of fields, such as a function identifier, a business impact value, a function description, function dependencies, asset dependencies, a function impact vector, relative asset values, and the like. Such fields may either be determined by the system 110 using techniques known in the art, or provided by operators of the network environment 100.

The function identifier may be used to uniquely identify the function definitions. The function description may provide a natural language description of the function definition. The function description may be used for describing the function definition for generating reports, or when requested.

In some embodiments, the function definitions may have dependencies associated therewith. For example, a first function definition may be associated with development and updation of an online service, and a second function definition may correspond to deployment of the online service. A first asset (or a first set of assets) may perform the first function and a second asset (or a second set of assets) may perform the second function, where the second asset becomes dependent on the first asset to perform the second function (since deployment can only happen after the online service is developed).

Further, the function dependencies may indicate a list of dependencies, i.e. other functions dependent on the current function. The function dependencies may be represented using another data structure, such as adjacency lists or adjacency matrices used to represent directed graphs. In some embodiments, the graphs may be acyclic. Function dependencies may indicate how important a function is to the network environment 100. For example, if a master function has a higher number of assistive functions dependent on it (in comparison to other functions), then the master function may be determined to be more important since if the master function is attacked/compromised, then all other functions dependent on it may misbehave or cease to function.

Further, the function definitions may also include asset dependencies representing dependencies between assets that perform the assigned function(s). In some embodiments, dependencies between the assets 104 may arise due to function dependencies. In other embodiments, dependencies may arise between the assets 104 within the functions. For example, a function that executes and stores financial transactions may include a first asset that stores a record for the transaction in a database may be dependent on a second asset that executes the transaction. The asset dependencies may also be represented using directed graphs.

The business impact value may indicate the importance of a function for the network environment 100, which may differ for different organizations. For example, when the network environment 100 is operated by a research organization, higher business impact value to research and development than for sales, and vice-versa when the network environment 100 is operated by a commercial organization. The function definitions may also include the function impact vector associated therewith. The function impact vector may represent CIA values/vector assigned to the function. The function impact vector may be determined based on the function description, function dependencies, and the like. The function definition further includes a relative asset value assigned to assets 104 associated with the function. The relative asset values indicate the local importance of the assets 104 of the function. The relative asset values may allow the assets 104 to be ranked in order of importance.

Each of the assets 104 may include one or more vulnerabilities. Each vulnerability may be associated with an attack technique. Examples of attack techniques may include phishing to obtain credentials, flash drive injections, denial or services attacks to take down a server, infecting assets with viruses, and the like, but not limited thereto. Attackers may use any one of the attack techniques to exploit the vulnerabilities for nefarious purposes. In some instances, attackers may use a first vulnerability in a first asset to enter into the network environment 100, and use a second vulnerability in a second asset for lateral movement, to further identify other assets to compromise. Each vulnerability may have a CIA vector associated therewith (hereafter referred to as vulnerability impact vector).

Each of the attack techniques may be mitigated or countered using a corresponding security control. The security controls may be pre-determined and stored in the database 210, or generated dynamically based on the attack. The system 110 may be configured to recommend security controls methods/means to resolve or mitigate the vulnerabilities, or as a counter measure for an attack on the network environment 100. In some embodiments, the security control may correspond to processor-executable instructions to resolve the vulnerabilities. For example, the security control may correspond to encrypting messages or communications happening between two or more of the assets 104. Other examples may include verification of credentials associated with a human asset for accessing a subset of assets in the network environment 100, such as certain database holding personally identifiable information. In other examples, a security control for mitigating risk of phishing may be two-factor authentication. In further examples, a security control for infections from flash drive injections may be mitigated through use of flash drive cleaning stations, or use of anti-virus software/engine that scan the contents of the flash drive before allowing the assets 104 to read them. In other embodiments, the security control may include physical methods to be implemented to improve cyber security. For example, the system 110 may recommend the server room of the organization to be physically locked to prevent unauthorized access, such as by internal attackers.

The system 110 manages the cyber security risk of the network environment 100, by determining a cyber risk value for the network environment 100, and recommending security control means to reduce the cyber risk value. The system 110 uses the asset weights and the vulnerability impact vector, among others, to determine the cyber risk value and select security control therefor. The system 110 may iteratively explore which combinations of security control means, when applied to a subset of the assets 104, reduce the cyber risk value.

The system 110 may include a plurality of components that enable the aforementioned operations to be performed. In some embodiments, the system 110 may be implemented in a hardware, or a suitable combination of hardware and software. Further, the system 110 may include one or more processors 202, Input/Output (I/O) interface(s) 206, and a memory 204, as illustrated and described in reference to FIG. 2. Further, the system 110 may also include other units such as a display unit, an input unit, an output unit, and the like, however the same are not shown in FIG. 2, for the purpose of clarity.

In some embodiments, the system 110 may be a hardware device including the processors 202. The processors 202 may be configured to execute machine-readable program instructions. Execution of the machine-readable program instructions by the processors 202 may enable the proposed system 110 to manage the cybersecurity risks of the network environment 100. The "hardware" may include a combination of discrete components, microprocessors, microcomputers, microcontrollers, digital signal processors, central processing units, state machines, logic circuits, an integrated circuit, an application-specific integrated circuit, a field programmable gate array, a digital signal processor, or other suitable hardware that manipulate data or signals based on operational instructions. The "software" may include one or more objects, agents, threads, lines of code, subroutines, separate software applications, or other suitable software structures operating in one or more software applications or on one or more processors. Among other capabilities, the processor 202 may fetch and execute machine-readable/processor-executable instructions in the memory 204 operationally coupled with the system 110 for performing tasks such as data processing, input/output processing, feature extraction, and/or any other functions. Any reference to a task in the present disclosure may refer to an operation being or that may be performed on data.

The memory 204 may store one or more machine-readable/processor-executable instructions or routines, which may be fetched and executed to create or share the data units over a network service. In some embodiments, the memory 204 may include any non-transitory storage device including, for example, volatile memory such as Random Access Memory (RAM), or non-volatile memory such as an Erasable Programmable Read-Only Memory (EPROM), flash memory, and the like.

The I/O interface(s) 206 may facilitate communication between the system 110, and the assets of the network environment 100. The interface(s) 206 may also provide a communication pathway for one or more components of the system 110. Examples of such components include, but are not limited to, processing engine(s) 208 and database 210.

The database 210 may include data that is either stored or generated as a result of functionalities implemented by any of the components of the processing engine(s) 208. For example, the database 210 may store the asset weights, and other values and data structures resulting from operation of the processors 202.

In an embodiment, the processing engine(s) 208 may be implemented as a combination of hardware and software (for example, programmable instructions) to implement one or more functionalities of the processing engine(s) 208. For example, the programming for the processing engine(s) 208 may be processor-executable instructions stored on a non-transitory machine-readable storage medium and the hardware for the processing engine(s) 208 may include a processing resource (for example, one or more processors), to execute such instructions. Examples of the processing engine(s) 208 may include an asset weight determination engine 212, an attack path generation engine 214, a cyber risk determination engine 216, a treatment engine 218, and other engine(s) 220. The other engine(s) 220 may implement functionalities that supplement applications/functions performed by the system 110. Each of the processing engine(s) 208 may be configured to perform at least one task of the system 110.

In some embodiments, the system 110 may be configured to implement the methods 300 and 350 shown in FIGS. 3A and 3B, respectively.

FIG. 3A illustrates a flowchart for an example method 300 for cyber risk assessment, in accordance with the embodiments of the present disclosure.

At step 302, the method 300 may include determining, such as by the processor 202 of the system 110, for example, asset weights for each of the assets 104 in the network environment 100. The asset weights for each asset 104 may be determined as a weighted average of a function impact vector of the functions using a corresponding business impact value and a corresponding relative asset value of the asset for the function. For example, for each asset, the function impact vectors (represented by a CIA vector) of each function may be multiplied by corresponding business impact values, and relative asset value of that asset in that function. Then, the resulting value for each function may be summed/averaged to obtain the asset weight. The asset weight, hence, is a CIA vector where each value is a weighted average/sum of each corresponding value of each function associated with the asset 104. The asset dependencies, function dependencies, and other information in the function definitions may also be used for determining the asset weights. In some embodiments, the asset weights may be determined by the asset determination engine 212.

At step 304, the method 300 includes determining a vulnerability impact vector for each of the vulnerabilities associated with each asset 104. In some embodiments, the vulnerabilities for each asset 104 may be known or provided by the operators of the network environment 100, based on which the vulnerability impact vector may be determined and assigned to each vulnerability. In other embodiments, the system 110 may be configured to identify vulnerabilities based on configuration information of each asset 104 using techniques known to those skilled in art, and determine the vulnerability impact vectors therewith.

At step 306, the method 300 includes generating one or more attack paths based on the vulnerabilities. Attack paths are unexpected/unintended/unauthorized communication path/channel between the assets 104. The attack paths may correspond to paths used for lateral movement between a subset of assets. The attack paths may also be represented using a direct graph, or associated data structures. In some embodiments, the attack paths may be generated by the attack path generation engine 214.

At step 308, the method 300 includes determining a cyber risk value based on the attack paths using the asset weights and the vulnerability impact vectors of each asset in the subset of assets. In some embodiments, the cyber risk value may be determined by the cyber risk determination engine 216.

In some embodiments, for determining the risk value, the method 300 includes determining an impact value for each attack path. The impact value may be determined as the aggregation/sum of dot products of the asset weights and the corresponding impact vectors for each asset in the subset of assets associated with each attack path. The (most damaging) attack path having a highest impact value may be selected and determined to be the cyber risk value. The most damaging attack path is an attack path that is likely to cause the most damage to the network environment.

In some embodiments, the most damaging attack path may be determined using a graph traversal algorithm, such as a modified Dijkstra's algorithm described hereafter. In some embodiments, for selecting the attack paths having the highest impact value, the method 300 may include initializing a partial impact value to each of the assets 104 to a predetermined value (such as to 0 for example), and identifying one or more entry point assets from the assets 104. Further, until one or more target assets are reached, the method 300 includes iteratively identifying one or more next/subsequent assets reachable from a prior asset, and traversing to each of the next assets. At each traversal, the partial impact values associated with each of the next assets are incremented by a sum of a dot product of the corresponding asset weights and the corresponding vulnerability impact vector, and the partial impact value of the prior asset For the first iteration, the entry point asset is the prior asset. The next assets are assets that are reachable from the prior asset. For example, when the assets 104 are represented in a graph, the next asset are assets 104 that are connected to the prior asset via an edge. In the subsequent iteration, the next assets of the previous iterations become the prior asset(s), from which dot products for next asset thereof are determined and summed with the partial impact vector of the prior asset. The iteration may continue until the target asset is reached. In some embodiments, the target asset may be predetermined and provided to the system 110 by the operators. In other embodiments, the target asset may be a terminating asset, i.e. an asset not having connections to other assets 104 that have not been traversed. The system 110 may determine whether the next asset is a terminating asset during run-time.

At each iteration, the partial impact value may be updated. The partial impact value at the target asset may be the sum of dot products of asset weights and vulnerability impact vectors of all the assets 104 traversed for the attack path. Once the target asset is reached, the partial impact value of the target asset may be determined to be the impact value of the attack path.

The cyber risk value may indicate how secure is the network environment 100. Cyber risk value may be determined periodically at predetermined intervals, or each time configuration of the assets 104 are changed, such as when new services are introduced, or when the assets 104 are replaced or upgraded, or when new vulnerabilities or attack techniques are discovered, for example, thereby allowing the cyber security risk of the network environment 100 to be dynamically adapted to changing organizational circumstances. Reports may be generated using the cyber risk value and the attack paths that adversely affect the cyber risk value.

In some embodiments, cyber risk value may be calculated each time a security control is applied during treatment. FIG. 3B illustrates a flowchart for an example method 350 for cyber risk treatment, in accordance with embodiments of the present disclosure. The method 350 may also be implemented by the system 110.

At step 352, the method 350 includes determining the cyber risk value for the network environment 100. In some embodiments, the cyber risk value may be determined using the method 300. In other embodiments, the cyber risk value may be determined using other techniques known to those skilled in the art. At step 354, the method 350 may include determining if cyber risk value is less than a risk threshold. If yes, the method 350 stops. If no, the method 350 proceeds to step 356. Until the cyber risk value of the network environment 100 falls below a predetermined threshold, the method 350 includes iterating steps 352-358. The risk threshold may be predetermined and/or selected by the operators.

At step 356, the method 350 includes generating attack paths based on the asset weights and the vulnerability impact vectors associated with each of the assets 104. In some embodiments, the attack paths may be generated using graph traversal algorithms, such as the modified Dijkstra's algorithm described above. In In other embodiments, the attack paths are generated by tracing the lateral movement taken by the attacker. For example, if the network environment 100 is being attacked or was previously attacked, the attack path taken by the attacker may be traced. In further embodiments, the attack paths may be identified using techniques know to those skilled in the art.

At step 358, the method 350 includes applying/executing a security control to mitigate attack techniques associated with the one or more vulnerabilities. Applying the security controls may change the asset weights, the vulnerability impact vectors, and the attack paths, which may be redetermined before the start of next iteration. After step 358, the method 350 may return to step 352 to determine the updated cyber risk value. The cyber risk value may change due to the application of the security control. The security control applied may be selected to reduce mitigate/counter the vulnerabilities such that the cyber risk value decreases on application.

Figure 4A:
FIG. 4A illustrates an example representation of attack paths in the network environment, according to embodiments of the present disclosure.
Figure 4B:
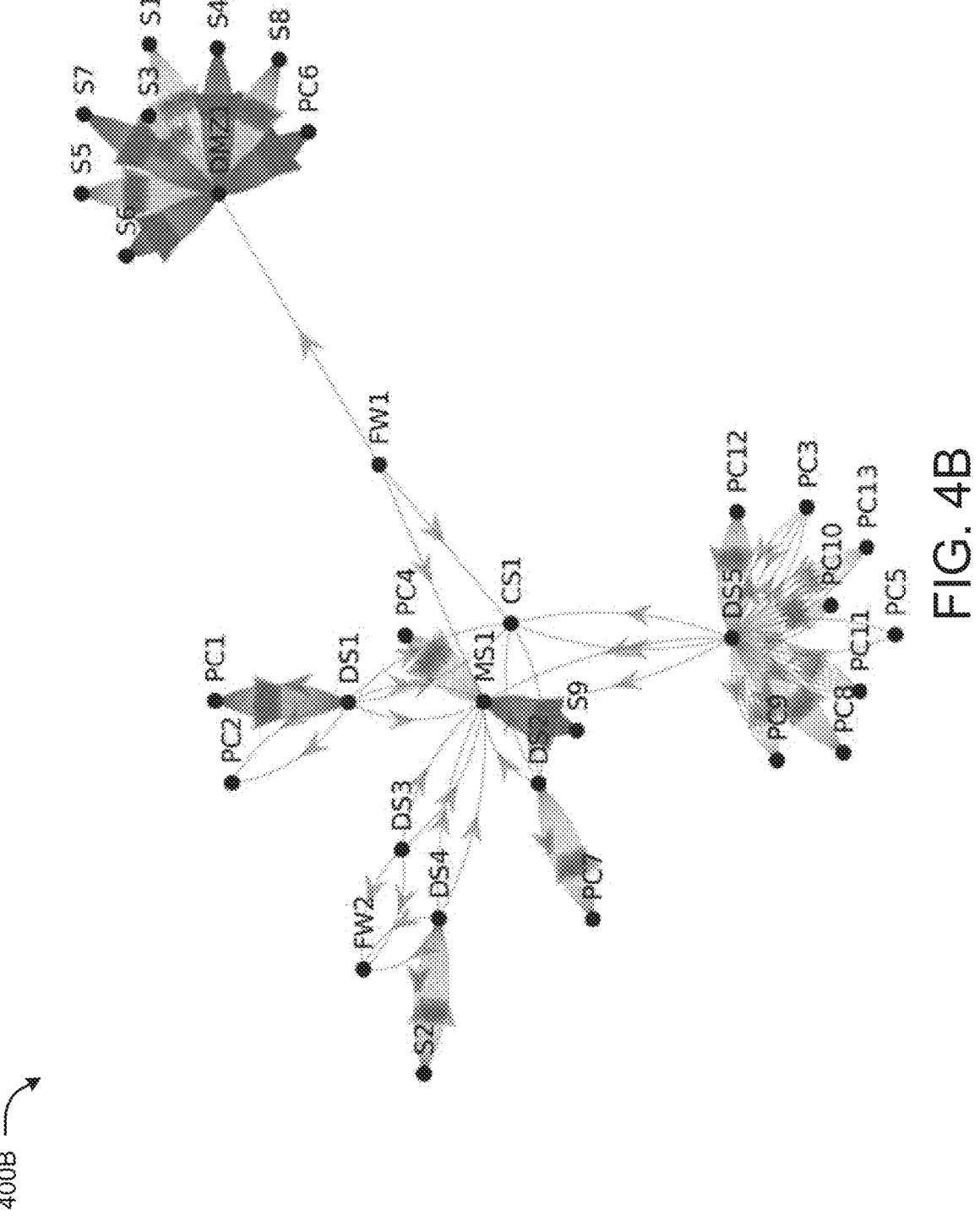
FIG. 4B illustrates an example representation of attack paths in the network environment after applying security controls, according to embodiments of the present disclosure.

In some embodiments, the security control may be applied/executed in a simulated environment. In such embodiments, the method 350 may include providing the security control applied in each iteration as a recommendation to operators of the network environment 100. In some examples, the recommendations may be in the form on natural language text, and may be displayed on a graphical user interface of the asset operated by the operator. In some examples, a first cyber risk value may be calculated to determine a baseline risk value. For example, the first cyber risk value for a network environment 100 is depicted in FIG. 4A may be 35270. FIG. 4A also shows the attack paths identified for the network environment 100. As shown, the number of attack paths may be high (depicted by dense connections between each of the assets 104 referenced by S1-S9, PC1-PC13, DS1-DS5, FW1-FW2, MS1, and DMZ1) before applying the security controls. The system 110 may then apply a security control, and determine a second cyber risk value, such as in a simulated environment. For example, the second cyber risk value may fall to 20480 after applying the security control. If the second cyber risk value is less than the first cyber risk value (or below a threshold), then the applied security control may be provided as a recommendation to the operators of the network environment 100. After applying the security control, one or more of the attack paths may be mitigated/precluded, as shown in FIG. 4B. FIG. 4B illustrates a graph having sparse connections between the assets 104 (compared to FIG. 4A), indicating mitigation of attack paths through application/execution of the security controls. By applying the security controls, the system 110 may prevent attackers from exploiting vulnerabilities in the assets 104 of the network environment 100, thereby enhancing its cyber security.

While the aforementioned methods are described as being perform by the system 110, it may be appreciated by those skilled in the art that the method may be suitably adapted for implementation using any other device, stored in computer-readable medium or performed by any other person. Further, it may be appreciated that the order in which the methods 300, 350 are described is not intended to be construed as a limitation, and any number of the described method steps may be combined or otherwise performed in any order to implement the methods 300, 350 or an alternate method. Additionally, individual steps may be deleted from the methods 300, 350 without departing from the scope of the present disclosure described herein. Furthermore, the methods 300, 350 may be implemented in any suitable hardware, software, firmware, or a combination thereof, that exists in the related art or that is later developed. The methods 300, 350 describe, without limitation, the implementation of the system 110. Those skilled in the art will understand that methods 300, 350 may be modified appropriately for implementation in various manners without departing from the scope of the present disclosure.

The present disclosure, hence, allows for cyber security risk management by determining a cyber security risk value based on asset weights associated with assets of the network environment 100. The present disclosure allows the asset weights to be determined based on business impact value, information criticality values (i.e. confidentiality value, integrity value, and availability value), asset dependencies, function dependencies, and the like. Dynamically determining the cyber risk value allows cyber security means to be adapted according to changes in the business environment/network environment 100. The present disclosure further allows potential attack paths to be identified, and security control measures to be recommended for preventing the identified attack paths from being exploited.

The system 110 may allow the cyber risk of the network environment 100 to be managed, and ensure continuity of their operations/functions and protect their assets 104. The system 110 may perform cyber risk assessments and treatments continually, or predetermined intervals to prevent sophisticated and frequent cyber threats from posing a significant challenge to the operation of the network environment 100. By implementing a structured risk management approach (such as by factoring all assets 104 and vulnerabilities thereof to determine the cyber risk value), operators of the network environment 100 may proactively identify and address potential risks, thereby reducing the likelihood of negative consequences and ensuring their sustainability. Hence, the present disclosure helps organizations establish a robust and proactive approach to managing cybersecurity risks and improving their overall security posture.

Figure 5:
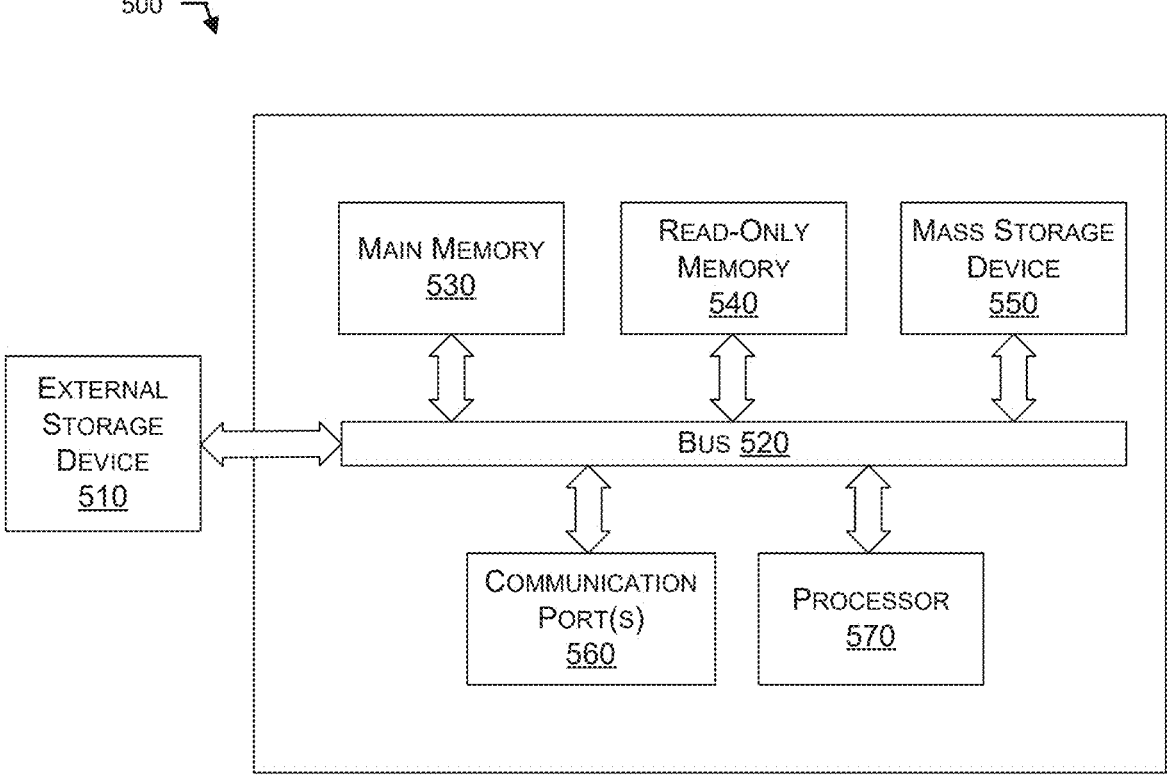
FIG. 5 illustrates an example computer system in which or with which embodiments of the system may be implemented, according to embodiments of the present disclosure.

Referring to FIG. 5, the block diagram represents a computer system 500 that includes an external storage device 510, a bus 520, a main memory 530, a read only memory 540, a mass storage device 550, a communication port 560, and a processor 570. A person skilled in the art will appreciate that the computer system 500 may include more than one processor 570 and communication ports 560. The processor 570 may include various modules associated with embodiments of the present disclosure. The communication port 560 can be any of a Recommended Standard 232 port for use with a modem-based dialup connection, a 10/100 Ethernet port, a Gigabit or 10 Gigabit port using copper or fiber, a serial port, a parallel port, or other existing or future ports. The communication port 560 may be chosen depending on a network, such as a Local Area Network (LAN), a Wide Area Network (WAN), or any network to which computer system 500 connects.

In an embodiment, the memory 530 can be a RAM, or any other dynamic storage device commonly known in the art. The Read-Only Memory (ROM) 540 may be any static storage device(s) e.g., but not limited to, a Programmable Read-Only Memory (PROM) chip for storing static information. The mass storage 550 may be any current or future mass storage solution, which may be used to store information and/or instructions. Exemplary mass storage solutions may include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g., an array of disks (e.g., SATA arrays).

In an embodiment, the bus 520 communicatively couples the processor(s) 570 with the other memory, storage, and communication blocks. The bus 520 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects the processor 570 to the computer system 500.

In another embodiment, operator and administrative interfaces, e.g., a display, keyboard, and a cursor control device, may also be coupled to the bus 520 to support direct operator interaction with computer system 500. Other operator and administrative interfaces may be provided through network connections connected through communication port 560. In some embodiments, the external storage device 510 can be any kind of external hard-drives, floppy drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system 500 limit the scope of the present disclosure.

While the foregoing describes various embodiments of the present disclosure, other and further embodiments of the present disclosure may be devised without departing from the basic scope thereof. The scope of the present disclosure is determined by the claims that follow. The present disclosure is not limited to the described embodiments, versions or examples, which are included to enable a person having ordinary skill in the art to make and use the present disclosure when combined with information and knowledge available to the person having ordinary skill in the art.

What is claimed is:

1. A method for cyber risk assessment, comprises:
   determining asset weights for each of one or more assets in a network environment, wherein each of the one or more assets is associated with one or more functions, and wherein the asset weights for each asset in the one or more assets are determined as a weighted average of a function impact vector of the one or more functions using a corresponding business impact value and a corresponding relative asset value of the asset within the function impact vector;

determining a vulnerability impact vector for each of one or more vulnerabilities associated with each asset in the one or more assets;

generating one or more attack paths based on the one or more vulnerabilities, wherein each of the one or more attack paths indicate paths for lateral movement between a subset of assets from the one or more assets; and determining a cyber risk value based on the one or more attack paths using the asset weights and the vulnerability impact vectors of each asset in the subset of assets.

2. The method of claim 1, wherein for determining the cyber risk value, the method comprises:

determining an impact value for each attack path in the one or more attack paths; and selecting a highest impact value from the impact values associated with the one or more attack paths as the cyber risk value.

3. The method of claim 2, wherein for determining the impact value, the method comprises:

determining a dot product of the asset weight and the corresponding impact vector for each asset in the subset of assets associated with each attack path; and aggregating the dot products for each of the assets in the subset of assets to obtain the impact value for each attack path.

4. The method of claim 2, wherein for selecting the attack path having the highest impact value, the method comprises:

initializing a partial impact value for each of the one or more assets to a predetermined value;

identifying one or more entry point assets from the one or more assets; and until one or more target assets are reached, iteratively identifying one or more next/subsequent assets reachable from a prior asset; and traversing to each of the one or more next assets and incrementing the partial impact values associated with each of the next assets by a sum of a dot product of the corresponding asset weights and the corresponding vulnerability impact vector, and the partial impact value of the prior asset.

5. The method of claim 1, wherein the cyber risk value is determined periodically at predetermined intervals or each time a configuration of the one or more assets is changed.

6. A method for cyber risk treatment, comprising:

until a cyber risk value of a network environment having one or more assets falls below a predetermined threshold, iteratively:

generating one or more attack paths based on an asset weight and a vulnerability impact vector associated with each asset in the one or more assets, wherein each of the one or more assets is associated with one or more functions, and wherein the asset weight for each asset in the one or more assets is determined as a weighted average of a function impact vector of the one or more functions using a corresponding business impact value and a corresponding relative asset value of the asset within the function; and applying/executing a security control to mitigate attack techniques associated with the one or more vulnerabilities.

7. The method of claim 6, wherein the security control is applied in a simulated environment, and wherein the method comprises providing the security control applied in each iteration as a recommendation to operators of the network environment.

8. The method of claim 6, wherein the one or more attack paths are generated by tracing the lateral movement taken by an attacker.

9. A system for cyber risk assessment, comprising:

a processor; and a memory coupled to the processor, wherein the memory comprises one or more processor-executable instructions that cause the processor to:

determine asset weights for each of one or more assets in a network environment, wherein each of the one or more assets is associated with one or more functions, and wherein the asset weights for each asset in the one or more assets are determined as a weighted average of a function impact vector of the one or more functions using a corresponding business impact value and a corresponding relative asset value of the asset within the function impact vector;

determine a vulnerability impact vector for each of one or more vulnerabilities associated with each asset in the one or more assets;

generate one or more attack paths based on the one or more vulnerabilities, wherein each of the one or more attack paths indicate paths for lateral movement between a subset of assets from the one or more assets; and determine a cyber risk value based on the one or more attack paths using the asset weights and the vulnerability impact vectors of each asset in the subset of assets.

10. A system for cyber risk treatment, comprising:

a processor; and a memory coupled to the processor, wherein the memory comprises one or more processor-executable instructions that cause the processor to:

until a cyber risk value of a network environment having one or more assets falls below a predetermined threshold, iteratively:

generate one or more attack paths based on an asset weight and a vulnerability impact vector associated with each asset in the one or more assets, wherein each of the one or more assets is associated with one or more functions, and wherein the asset weight for each asset in the one or more assets is determined as a weighted average of a function impact vector of the one or more functions using a corresponding business impact value and a corresponding relative asset value of the asset within the function impact vector; and apply/execute a security control to mitigate attack techniques associated with the one or more vulnerabilities.

11. A non-transitory computer-readable medium comprising processor-executable instructions that cause a processor to:

determine asset weights for each of one or more assets in a network environment, wherein each of the one or more assets is associated with one or more functions, and wherein the asset weights for each asset in the one or more assets are determined as a weighted average of a function impact vector of the one or more functions using a corresponding business impact value and a corresponding relative asset value of the asset within the function impact vector;

determine a vulnerability impact vector for each of one or more vulnerabilities associated with each asset in the one or more assets;

generate one or more attack paths based on the one or more vulnerabilities, wherein each of the one or more attack paths indicate paths for lateral movement between a subset of assets from the one or more assets; and determine a cyber risk value based on the one or more attack paths using the asset weights and the vulnerability impact vectors of each asset in the subset of assets.

12. A non-transitory computer-readable medium comprising processor-executable instructions that cause a processor to:

until a cyber risk value of a network environment having one or more assets falls below a predetermined threshold, iteratively:

generate one or more attack paths based on an asset weight and a vulnerability impact vector associated with each asset in the one or more assets, wherein each of the one or more assets is associated with one or more functions, and wherein the asset weight for each asset in the one or more assets is determined as a weighted average of a function impact vector of the one or more functions using a corresponding business impact value and a corresponding relative asset value of the asset within the function impact vector; and apply/execute a security control to mitigate attack techniques associated with the one or more vulnerabilities.

\*    \*    \*    \*    \*